United States Patent [19]
Agatsuma et al.

[11] 4,161,062
[45] Jul. 17, 1979

[54] METHOD FOR PRODUCING HOLLOW SUPERCONDUCTING CABLES

[75] Inventors: Ko Agatsuma, Akishima; Kenichi Koyama, Tokorozawa; Itaru Todoriki, Tanashi; Tetsuo Yamaguchi, Yokohama; Osamu Kohno, Chiba; Takashi Saito, Yokohama, all of Japan

[73] Assignees: Agency of Industrial Science and Technology; The Fujikura Cable Works, Ltd., both of Tokyo, Japan

[21] Appl. No.: 845,770

[22] Filed: Oct. 26, 1977

[30] Foreign Application Priority Data

Nov. 2, 1976 [JP] Japan .................................. 51-131264
Nov. 2, 1976 [JP] Japan .................................. 51-131265

[51] Int. Cl.² .......................................... H01V 11/00
[52] U.S. Cl. .................................. 29/599; 174/126 S
[58] Field of Search ........................ 29/599; 174/126 S

[56] References Cited

U.S. PATENT DOCUMENTS

| 3,641,665 | 2/1972 | Matricon ................................. 29/599 |
| 3,686,750 | 8/1972 | Woolcock et al. ..................... 29/599 |
| 3,800,414 | 4/1974 | Shattes et al. .......................... 29/599 |

*Primary Examiner*—C. W. Lanham
*Assistant Examiner*—V. K. Rising
*Attorney, Agent, or Firm*—Ladas, Parry, Von Gehr, Goldsmith & Deschamps

[57] ABSTRACT

A method for producing hollow superconducting cable comprises steps of providing grooves on the outer periphery of a hollow conductor adapted to be engageable therewithin fine multi-filamentary superconductors formed beforehand to be fitted into said grooves, and of fixing securely said multi-filamentary superconductors into said grooves by soldering with a metal having a low melting point.

10 Claims, 8 Drawing Figures

METHOD FOR PRODUCING HOLLOW SUPERCONDUCTING CABLES

BACKGROUND OF THE INVENTION

The present invention relates to a method for producing hollow superconducting cables, in particular, relates to a method for producing hollow superconductive cables applicable to superconducting magnet.

Superconducting cable of hollow type has various advantages of the following respects, that is, (1) cooling medium such as liquid helium and the like can be fed directly to a hollow portion of said cable so as to be capable of cooling the conductor directly through no medium of insulating material; (2) necessary amount of said cooling medium can be reduced to the least; (3) electromagnetic coil having large mechanical strength can be made because of unnecessity for providing the cooling space between layers in case of said cable being coiled; (4) overall space occupied by said coiled cable can be saved to the minimum; and (5) in case of precooling treatment being performed, precooling can be carried out with one and the same hollow cooling system. However, manufacturing of hollow superconducting cable as set forth above has to be accompanied with special processing technique, so that it has hitherto been deemed to be difficult in case of producing long hollow superconducting cables.

It has recently been developed a method for producing hollow type superconducting cables as disclosed in Japanese Patent Application Publication Gazette No. 3631 of 1975 which comprises a step of winding a plurality of fine superconducting wires around the outer periphery of a hollow conductor made of good conductive metal such as copper, etc., and a step of securely fixing said superconducting wires to the hollow conductor with a binding material. Said method is disclosed, as an embodiment, in such a manner that a superconducting wire having the outer diameter of 0.37 mm composed of Nb-Ti-Ta alloy wire of 0.25 mm is diameter covered with copper is wound around a hollow copper body having the inner diameter of 2.5 mm and the outer diameter of 3.5 mm, and then the former is fixed securely to the latter by soldering with an alloy containing Pb-50%Sn. Hence, the foregoing conventional method is defective in production process because of the need of said superconductive wires to be wound around the hollow conductor, said process is applicable to the case of employing superconducting material of alloy such as NbTi, NbZr, or NbTiZr alloy and the like, but is unable to be applied to the case of employing superconducting material belonging to intermetallic compound such as $Nb_3Sn$, $V_3Ga$, $Nb_3Ga$, $Nb_3Ge$, $Nb_3Si$, $Nb_3Al$, $Nb_3(Al_{0.8}Ge_{0.2})$, etc. The reason for bringing forth such defects as set forth above in the conventional method lies in that said alloy superconducting material has the property of relatively good workability, while the superconducting material belonging to intermetallic compound is, in general, extremely fragile, and has inferior property in workability, particularly in ducitility and malleability, thus causing difficulties in carrying out the aforementioned process for winding the superconducting wires belonging to intermetallic compound around the hollow conductor.

Now, such a process for producing superconducting material belonging to intermetallic compound is applicable to practical use that a plurality of metallic elements utilized as the material for composing the foregoing intermetallic compound are directly or indirectly brought into contact with one another and are subjected to heat treatment, thereby both of said metallic elements are diffused each other to compose intermetallic compound.

Accordingly, it may be considered such method for producing hollow superconducting cable comprised of intermetallic compound, on the basis of the aforesaid method, that wires composed of at least two kinds of metallic elements for composing intermetallic compound are wound around a hollow conductor in the course of the stage where intermetallic compound is not composed yet, and are fixed securely to said hollow conductor with a metallic binder, subsequently said wires fixed with metallic elements are subjected to heat treatment so as to obtain intermetallic compound. The foregoing method thus proposed, however, is accompanied with drawbacks in respect of such problems as copper pipes and the like to be used as a hollow conductor are apt to be softened under heat treatment, and metallic binder in molten by heat treatment to cause exfoliation of the wires from said hollow conductor, thus the above-mentioned proposed method is difficult in application to practical use.

Now, superconductive material of intermetallic compound, such as $Nb_3Sn$, $V_3Ga$, $Nb_3Ga$ and the like has remarkably excellent property in superconducting as compared with the property of NbTi serving as alloy superconductive material as shown in FIGS. 1 and 2, so that it has seriously been required for the development of a method for producing hollow superconducting cables which are applicable to be put to practical use by employing superconducting material belonging to intermetallic compound.

The present invention is achieved in order to comply with the foregoing demand.

SUMMARY OF THE INVENTION

The main object of the present invention is to provide a method for producing hollow type superconducting cables applicable, in particular, to produce superconducting coils.

The second object of the present invention lies in to provide a method capable of producing practically and readily hollow superconducting cables without causing any difficulties in operation even in case of producing hollow superconducting cables by employing superconducting material having inferior workability such as, for instance, superconducting material belonging to intermetallic compound.

The third object of the present invention resides in provision of a method for producing hollow superconducting cables in which no such difficulties nor shortcomings are occurred as softening of pipes serving as hollow conductors in the course of heat treatment and exfoliation of superconductors from a hollow conductor caused by metallic binder for adhering superconductors to said pipes which is molten during heat treatment.

In order to fulfill the above-enumerated objects, according to the present invention, the hollow conductor is previously provided with grooves, and extremely fine multifilamentary superconductors are formed beforehand in the shape to fit into said grooves. In other words, the present inventive method comprises a step of forming a hollow conductor, made of conducting material, having passages of cooling medium in the inner part thereof and having grooves formed on the outer periphery along the longitudinal direction thereof, a step of manufacturing extremely fine multifilamentary superconductors having the shape adapted to fit in said grooves provided on said hollow conductor, and a step of engaging said superconductors within the foregoing grooves to securely fix said superconductors to said grooves by a metal having a low melting point. Since said extremely fine multifilamentary superconductors are formed in the course of manufacturing stage to have such a shape adapted to fit in the grooves of said hollow conductor as described hereinbefore, it is not necessary to take such a step of process for winding said superconducting wires around the hollow conductor as explained in the chapter of "BACKGROUND OF THE INVENTION," and is also not necessary to take a step of heat treatment for composing superconducting intermetallic compound after a step of winding superconducting wires around the hollow conductor to be fixed securely thereto, thus according to the present invention, the hollow superconducting cables can be produced easily with employment of material having inferior property in workability such as superconducting material of intermetallic compound.

BRIEF DESCRIPTION OF THE DRAWINGS

FIG. 1 and FIG. 2 are graphs of various kinds of superconducting materials showing superconductivity characteristics to be compared with one another; in which FIG. 1 is a graph showing the variation in the critical current density with respect to the magnetic field strength of $Nb_3Sn$, $V_3Ga$ and NbTi respectively, and FIG. 2 is a graph showing the variation in the critical magnetic field with respect to the temperature of $Nb_3Sn$ and NbTi;

DESCRIPTION OF THE PREFERRED EMBODIMENT

Figure 1:
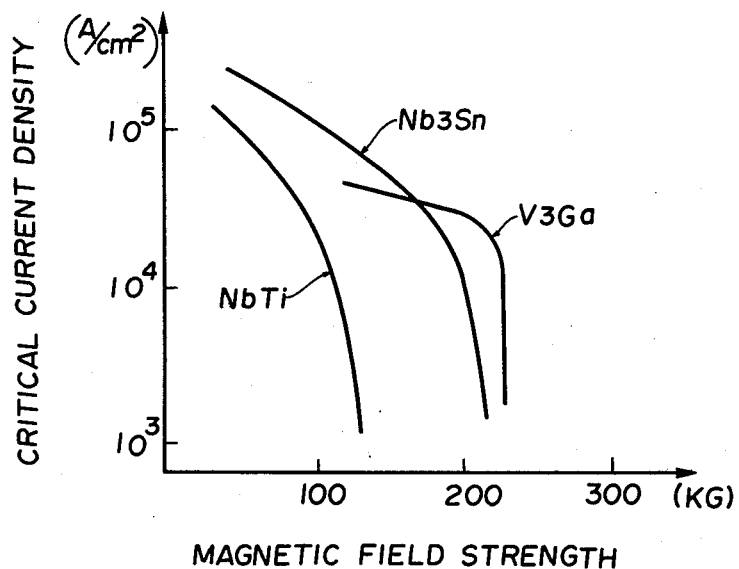
Figure 2:
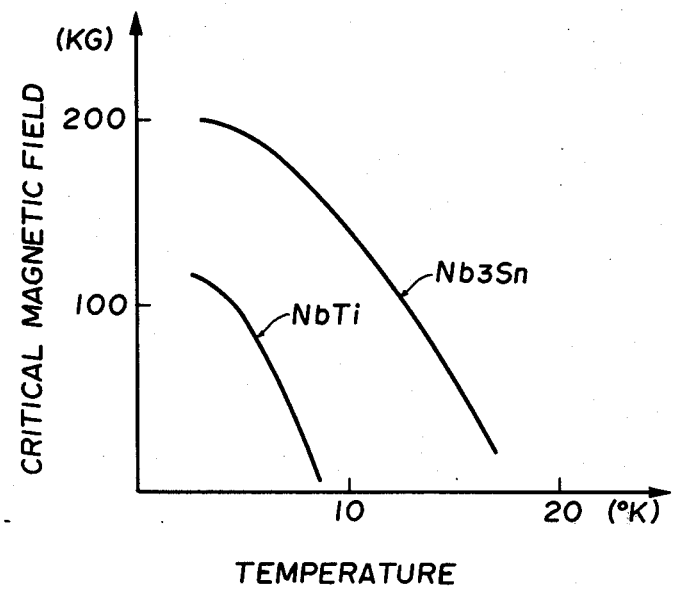
Figure 3:
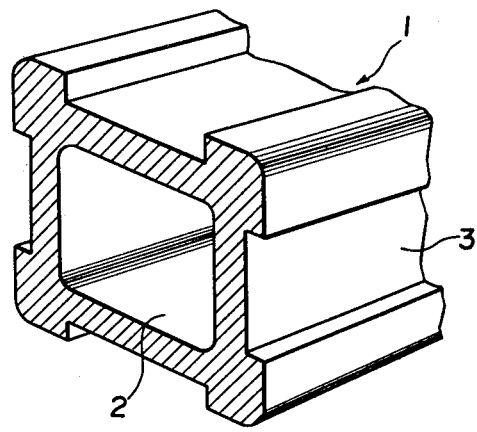
FIG. 3 is a perspective view of a partially cutaway hollow conductor applied to a method according to the present invention showing an example in a form of embodiment.

A hollow conductor used in the method of the present invention is composed of a good conducting material such as copper material, for instance, oxygen free copper, tough pitch copper, high purely aluminium, etc. The foregoing hollow conductor 1 is to be manufactured, for example, in a large length having a rectangular shape in section as shown in FIG. 3 and is provided at the inner part thereof with a passage 2 for a cooling medium such as liquid helium and the like. Further, on the outer periphery of said hollow conductor 1, at least one groove 3 is formed in the lengthwise direction. Plural grooves may be formed on each of the peripheral flat surfaces of said hollow conductor 1. Furthermore said groove may be formed in wide-pitched spiral on the outer periphery of said hollow conductor. In an embodiment of FIG. 3, a groove 3 is formed on each of four peripheral flat surfaces of the hollow conductor 1 respectively, however, only one flat surface or two oppositely located surfaces may be provided with a groove 3 respectively. In case of a groove 3 being formed on each of the foregoing symmetrically located two surfaces, said groove 3 is preferably provided on these two surfaces having wider area in dimension than that of other two surfaces.

Means for previously manufacturing such hollow conductor as set forth hereinbefore is optionally selected from any processes such as, for instance, an extrusion process, a drawing process, or otherwise said groove may be formed on the outer periphery of a pipe by means of cutting by machine. The aforementioned groove is serviceable to engage therewithin an extremely fine multifilamentary superconductors which is formed in a subsequent step of the present inventive method.

Furthermore, superconducting material for composing extrmely fine multifilamentary superconductors as mentioned above may alternatively be utilized alloy material such as NbTi, NbZr, Nb-Ti-Zr, etc., or material of intermetallic compound such as $Nb_3Sn$, $V_3Ga$, $Nb_3Ga$, $Nb_3Ge$, $Nb_3Si$, $Nb_3Al$, $Nb_3(Al_{0.8}Ge_{0.2})$, etc., however, the explanation will be given chiefly on superconducting material of intermetallic compound to be employed.

Figure 4:
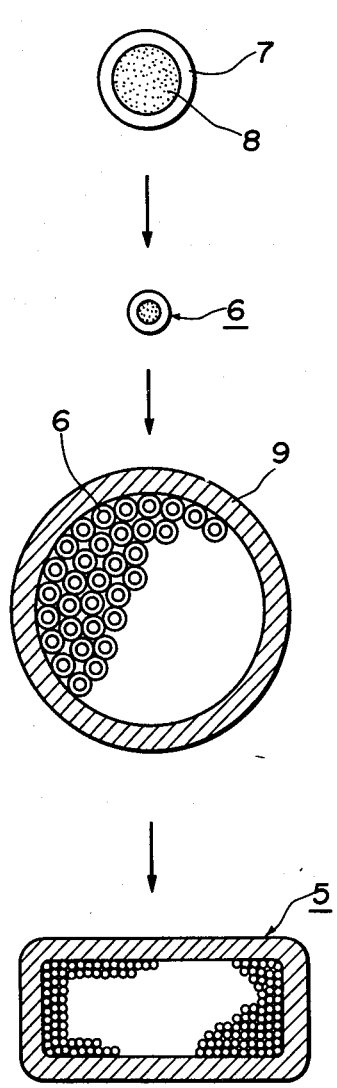
FIG. 4 is an explicative flow diagram of an extremely fine multifilamentary superconductor showing steps of process, as an example, for producing the above-mentioned cable in the present inventive method.

In the first step of process according to the present invention, manufacturing is carried out for an extremely fine multifilamentary superconductor 5 having such a shape as being fit in the groove 3 of said hollow conductor 1 and also having a great number of cores made of superconducting material illustrated roughly in the flow diagram of FIG. 4. In the course of the foregoing manufacturing step, a composite wire 6 in a rod-like shape or a linear shape is manufactured to be serviceable as a base body for composing superconducting intermetallic compound containing at least two kinds of metal elements. Said composite wire 6 contains at least two kinds of metal elements which are not yet turned out to be superconducting compound.

The aforementioned composite wire 6 is obtained in such a process that, for instance, a tube 7 made of an alloy composed of at least one of said two kinds of metal elements and copper (preferably oxygen free copper) is filled with rod-like material or a linear material composed of other element among said two kinds of metal elements, or otherwise powder material 8 of said other metal element, and subsequently said tube 7 is subjected to swaging or drawing work, etc. for contraction to a desired dimension in diameter. A plurality of said composite wires thus obtained are aggregated and inserted into a outer tube 9 made of good conducting material such as copper (preferable to oxygen free copper), aluminum and the like, then said outer tube 9 is subjected to swaging, drawing work or the like to be contracted the diameter thereof. After having been subjected to treatments such as the aforesaid insertion of said bunched composite wires as well as said diametral contraction work repeatedly once or more than twice, said outer tube 9 which is inserted with a great number of composite wires as a bundle, that is, an extremely fine multifilament is subjected to press work, drawing work, or extrusion work and the like in a final step to be formed to such a profile as being suitable to fit in a groove 3 provided on said hollow conductor. In other words, when the hollow conductor 1 shown in FIG. 3 is utilized, said extremely fine multifilament is formed to a shape having a rectangular profile in section. In this instance, said extremely fine multifilament is formed to have such dimensions that the width thereof is nearly equal to or a little bit smaller than the inner width of said groove 3 and the thickness is nearly equal to or a little bit smaller than the depth of said groove 3.

The above-mentioned formed body thus obtained, that is, the extremely fine multifilament having a predetermined configuration in which intermetallic compound has not been composed yet is subjected to heat treatment in the subsequent step. Said heat treatment is carried out in order to compose superconducting intermetallic compound by virtue of diffusion of at least two kinds of said metal elements, and the heat treatment conditions involving the temperature, atmosphere, treating time and the like are set to such conditions necessary for composing intermetallic compound by diffusion of the aforementioned more than two kinds of metals. In this way as set forth hereinbefore, the extremely fine multifilamentary superconductor 5 having the profile suitable to fit in the groove of said hollow conductor can be obtained.

Figure 5:
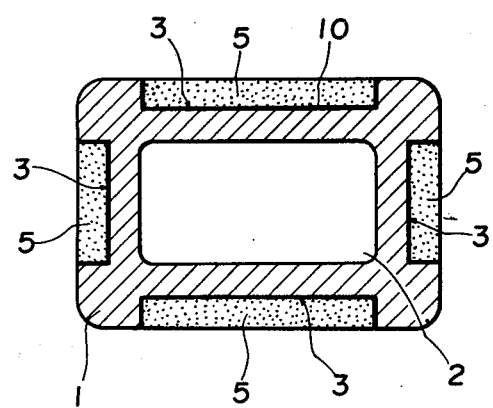
FIG. 5 is a cross sectional view of a hollow superconducting cable produced according to the present invention showing an example in a form of embodiment.

The extremely fine multifilamentary superconductor 5 thus obtained through the foregoing procedure is engaged within the groove 3 of said hollow conductor 1 as shown in FIG. 5, and then said extremely fine multifilamentary superconductor 5 is securely fixed within said groove 3 by soldering with a metal of a low melting point such as Sn, Pb-Ag alloy or Pb-Sn alloy (=solder), etc. In the aforesaid way of procedure, the hollow superconducting cable is obtained as an object for production in the present invention.

The composite wire producing process in the course of having been formed to fit in the groove 3 of the hollow conductor 1 just the same way as that mentioned above, said braided unit 12 is subjected to heat treatment so as to compose intermetallic compound, thereby the extremely fine multifilamentary superconductor 5' of a braided type, namely, a forming unit 5' is produced. Subsequent steps are followed just the same way as described hereinbefore. The braided unit 12, however, may be produced by braiding a plurality of composite wires without subjecting to any processing, as occasion demands, other than braiding a plurality of multifilament consisted of aggregation with a plurality of composite wires.

The above-mentioned braiding of extremely fine multifilaments or composite wires has the great advantage of the following respects, that is, restriction on combination electric current between each of composite wires, namely, between each of cores to be generated under fluctuation of the magnetic field can be effected because of the fact that within the extremely fine multifilamentary superconductor which is subjected to heat treatment under the condition of the intermetallic compound having been composed therein, each of composite wires, that is, each of core portions of said superconductor is not oriented in one and the same direction, thus, influence caused by fluctuation of said magnetic field in any orientation can be eliminated even in case of alternating current (A.C.) being utilized or pulse current being applied as well as stabilization in characteristic features along with maintenance of high current density are attained. Further, a hollow superconducting cable suitable for the frequency of alternating current as well as for the width of pulses can optionally be produced by changing pitches of braids. In case of said extremely fine multifilaments are not braided but are twisted at the stage prior to the forming step, favourable effect can be obtained nearly equal to the effects attained in case of braiding.

The method according to the present invention is basically applicable not only to superconducting material of intermetallic compound but also to an alloy superconducting material as set forth hereinbefore. In case of the present inventive method is applied to an alloy superconducting material, composite wire which has already been composed as superconducting alloy can be employed, and in this instance, heat treatment after subjecting superconducting alloy to a forming work can be eliminated, and in this case, it is desirable to carry out the process for forming such a shape as to fit to a groove of a hollow conductor after the extremely fine multifilaments having been braided just the same way to the case of employing the superconductive material of intermetallic compound. According to the present invention, however, excellent merit is obtained in case of employing superconducting material of intermetallic compound as having elucidated above.

As will clearly understood from the foregoing description, such shortcomings are enumerated hereinafter are thoroughly solved according to the present inventive method, that is, no defect is occurred in a winding operation as has been taken place in conventional methods, no drawbacks is occurred in a step of heat treatment which is carried out after the winding and adhering steps as have been taken place in conventional methods.

The present inventive method is, in particular, of great advantage to produce hollow superconducting cable practically and easily by employing superconducting material of intermetallic compound which has inferior workability. As is described above, a hollow superconducting cable can be produced with superconducting material of intermetallic compound according to the present inventive method, thereby hollow superconducting cables are able to be produced practically, said cables having such characteristics as high critical temperature (Tc), high critical magnetic field (Hc) and high critical current density (Jc), also large capacity as well as being suitable to be cooled, in particular, the present invention is able to produce such superconducting cable serviceable as pulsed magnet for nuclear fusion, and for energy storage, and further for MHD generator or linear induction motor. Moreover, in case of employing superconducting material of intermetallic compound, extremely fine multifilamentary superconductor can be formed to a desired shape to be engageable within a hollow conductor at the stage prior to the stage of composing intermetallic compound, thereby extremely fine multifilamentary superconductor of large length can be produced. Still further, when said superconductor is engaged within the hollow conductor, said extremely fine multifilamentary superconductor is not substantially loaded thereon with stress caused by working, thus hollow superconducting cable of large length can practically be produced.

The present invention will now be explained hereinafter with reference to the drawings by way of example in a form of embodiment of the invention.

EXAMPLE 1

Figure 8:
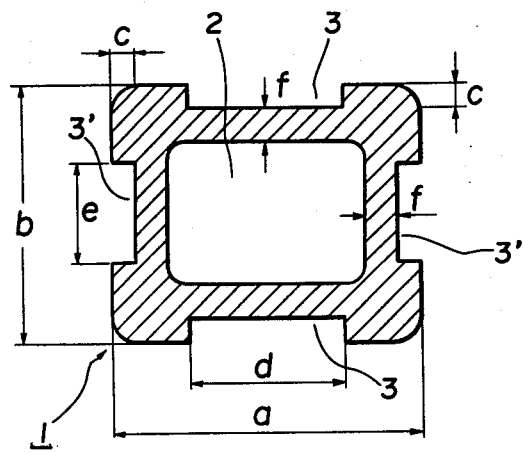
FIG. 8 is a cross sectional view of a hollow conductor to be employed in illustration of Example 1 of the present invention showing the detailed dimension of each portion thereof.

A hollow flat type conductor 1 made of copper having such a shape as shown in FIG. 8 has previously been prepared on one hand. The dimension of said conductor 1 at every portion are represented by a-f as follows:

| | |
|---|---|
| Full width of the hollow conductor | a = 5.0mm |
| Full thickness of the above | b = 4.0mm |
| Depth of grooves 3, 3' | c = 0.3mm |
| Width of groove 3 | d = 2.6mm |
| Width of groove 3' | e = 1.6mm |
| Thickness of grooves 3, 3' at the bottom | f = 0.5mm |

On the other hand, NbTi alloy having 10 mm in diameter is filled within a tube having the dimensions 15×11 mm dia. made of oxygen free copper, which tube was subjected to diametral contraction to be reduced to 1.0 mm dia. by swaging as well as drawing for obtaining composite wire. Subsequently, 61 pieces of composite wires were aggregated to be filled within a oxygen free copper outer tube having the dimension of 15×11 mm dia. which outer tube was subjected to diametral contraction working to be reduced to 1.0 mm dia. Then, a plurality of said tube were formed in flat type classified into two kinds of shapes, one of which has the dimension of 0.3 mm in thickness and 1.5 mm in width, the other of which has 0.3 mm thick and 2.5 mm wide, each of those dimensions is suitable to fit in corresponding grooves 3 and 3' provided on said hollow conductor, thus multifilamentary superconductors were obtained. These multifilamentary superconductors thus obtained were engaged within and fixed securely to each of corresponding grooves provided on said hollow conductor by employing solder (Sn-5%Ag) of a low melting point, thus a hollow superconducting cable of 300 m in length was obtained.

EXAMPLE 2

A rod-like Nb body having 7 mm of the outer diameter was inserted into a pipe made of Cu-10% Sn alloy having 8 mm of the inner diameter, and said pipe was subjected to drawing to be contracted its diameter to 1.6 mm of the outer diameter. 19 Pieces of said pipe thus contracted were aggregated to be filled within another pipe made of Cu-10% Sn alloy having 9 mm of the inner diameter, then said another pipe was subjected to diametral contraction working repeatedly to be formed in wire having 0.9 mm. dia. Subsequently, 61 pieces of said wires were aggregated to be inserted into a oxygen free copper outer tube having 9 mm of the inner diameter, and said copper outer tube was subjected to contraction working repeatedly to be finally formed in a flat type extremely fine multifilament having 0.5 mm in thickness and 2.5 mm in width. Said multifilament thus contracted was subjected to heat treatment at the temperature of 800° C. for 50 hours, thus extremely fine multifilamentary superconductors previously formed to a predetermined shape and composed thereon compound layers of Nb3Sn were produced. Said multifilamentary superconductors thus obtained were engaged within and securely fixed to grooves having the dimension of 2.8 mm in width and 0.6 mm in depth provided on the outer periphery of a flat type copper conductor having hollow center in section by employing solder (Sn-5%Ag) of a low melting point, and finally a hollow superconducting cable of 500 m in length was produced.

EXAMPLE 3

Figure 7:
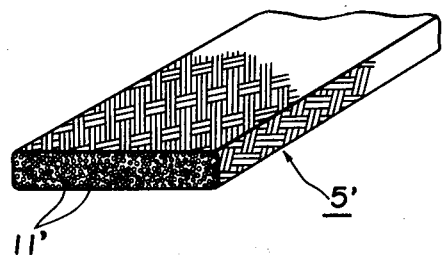
FIG. 7 is a perspective view of a forming unit of superconductors which are composed of said braided unit.

A niobium rod having 14 mm in the outer diameter was inserted into a copper tube having the inner diameter of a little larger than 14 mm and 3 mm in thickness, then said copper tube was subjected to diametral contraction working to be reduced to 0.2 mm in the outer diameter so as to obtain copper sheathed niobium wire. Subsequently, a plurality of said copper sheathed niobium wires were aggregated to be inserted into another copper tube just the same to the foregoing copper tube, and then said another copper tube thus inserted with aggregated wires was subjected to diametral contraction working to be reduced to less than 20 μm in diameter of an individual wire, then subjected to tin plating, thus composite wire is obtained. After the foregoing treatment, a plurality of said composite wires were braided to be formed in braided units. Further, said braided units were subjected respectively to compression molding to such rectangular shape as to fit in grooves provided on four surfaces of a flat type hollow conductor made of copper, and then said units were subjected to heat treatment under vacuum atmosphere at the temperature of 700° C. for 50 hours to compose intermetallic compound of Nb3Sn, thus a braided type extremely fine multifilamentary superconductor, namely forming units 5' as shown FIG. 7, were produced. After the foregoing step, 4 pieces of said forming units having already been subjected to heat treatment and said hollow conductor were fed into one and the same soldering both containing melted solder (Sn-5%Ag) to pass therethrough and to have said forming units engaged within corresponding grooves of said hollow conductor, so that said forming units were securely fixed to said hollow conductor with the help of solidified solder and a hollow superconducting cable was obtained.

EXAMPLE 4

Figure 6:
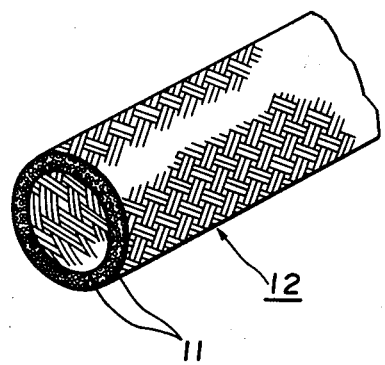
FIG. 6 is a perspective view of extremely fine multifilament showing a braided unit of said cable by way of an example.

A vanadium rod having 10 mm in the outer diameter was inserted into a pipe made of Cu-15%Ga alloy having the outer diameter 20 mm and the inner diameter 11 mm, and said alloy pipe was subjected to diametral contraction working to be reduced to form in a composite wire having the outer diameter 0.9 mm. Subsequently, a plurality of said composite wires thus contracted were inserted into a pipe just the same to the foregoing alloy pipe, then said pipe thus inserted with composite wires was subjected to diametral contraction working to be reduced to less than 50 μm in diameter of an individual composite wire, thus a linear body, as the whole structural appearance, was formed. Further, a plurality of said linear bodies thus obtained were aggregated in a bundle to be inserted into a oxygen free copper tube having 12 mm in the outer diameter and 9 mm in the inner diameter, then said copper tube thus inserted with linear bodies was subjected to diametral contraction working to be reduced to less than 10 μm in diameter of an individual linear body, thus an extremely fine multifilament was produced. A plurality of said extremely fine multifilaments thus produced were braided to be formed in a braided units 5 as shown FIG. 6, which unit was subjected to compression molding working to be formed in a flat type to fit in corresponding groove provided on each peripheral surface of a hollow rectangular conductor made of copper. Subsequently, said unit was subjected to heat treatment under vacuum atmosphere at the temperature of 650° C. for 100 hours so as to compose $V_3Ga$ compound, thus a braid type multifilamentary superconductor, namely forming unit 5' as shown FIG. 7, was obtained. After the foregoing treatment, 4 pieces of forming units 5' having been heated were respectively engaged within each of corresponding grooves 8 provided on said hollow conductor 6 simultaneously were fixed securely to said hollow conductor 6 with the help of solder having a low melting point, thus finally a hollow superconducting cable was obtained.

We claim:

1. In a method of producing hollow superconducting cables, comprising taking an elongated hollow conductor of normally conducting material, the periphery of which is provided in its lengthwise direction with at least one groove penetrating part-way towards the longitudinal axis of the hollow conductor, and locating within said groove a multifilament superconductor extending along the length of said groove, the improvement wherein the multifilament superconductor to be located in said groove is made beforehand by the steps of:
   (a) forming a multiplicity of composite wires, each composite wire containing at least two metallic elements that are mutually diffusible upon diffusion heat treatment to become a superconducting intermetallic compound;
   (b) braiding respective pluralities of said composite wires together to form a braided sleeve;
   (c) deforming said braided sleeve to provide it with the cross-sectional profile of said groove; and
   (d) subjecting said at least two metallic elements of the composite wires in the deformed braided sleeve to diffusion heat treatment causing said elements mutually to diffuse and become said superconducting intermetallic compound, thereby transforming said deformed braided sleeve into the multifilament superconductor to be located in said groove.

2. The improvement according to claim 1, wherein said superconducting intermetallic compound is selected from the group consisting of $Nb_3Sn$, $V_3Ga$, $Nb_3Ga$, $Nb_3Ge$, $Nb_3Si$, $Nb_3Al$ and $Nb_3(Al_{0.8}Ge_{0.2})$.

3. The improvement according to claim 1, wherein each composite wire is formed by filling a tube of an alloy containing copper and one of said at least two metallic elements with a material containing another of said at least two metallic elements, and by subjecting the filled tube to diametral reduction working.

4. The improvement according to claim 1, wherein each composite wire is formed by filling a copper tube with material containing one of said at least two metallic elements, subjecting the filled tube to diametral reduction working, and coating the diametrally reduced tube with another of said at least two metallic elements.

5. The improvement according to claim 3, wherein, prior to braiding, each plurality of said respective pluralities of composite wires is inserted as a bundle into a copper tube which is then subjected to diametral reduction working.

6. The improvement according to claim 4, wherein, prior to braiding, each plurality of said respective pluralities of composite wires is inserted as a bundle into a second copper tube which is then subjected to diametral reduction working.

7. The method according to claim 1, wherein the normally conducting material of said elongated hollow conductor is copper.

8. The method according to claim 1, wherein said elongated hollow conductor is of substantially rectangular cross-section, the hollow interior of which defines a passage permitting the flow therethrough of a cooling medium.

9. The method according to claim 7, wherein, after locating said multifilament superconductor within said groove, said superconductor is fixed in place by soldering with a low melting point metal selected from the group consisting of Pb-Sn alloy, Sn-Ag alloy and Sn.

10. The method according to claim 8, wherein said groove is one of four similar grooves, each penetrating part-way towards the longitudinal axis of said elongated hollow conductor from a respective outer side thereof; and wherein said multifilament superconductor is one of four similar superconductors, each located in a respective one of said grooves.

* * * * *